United States Patent
McIntyre et al.

(10) Patent No.: US 8,116,596 B2
(45) Date of Patent: Feb. 14, 2012

(54) RECOGNIZING IMAGE ENVIRONMENT FROM IMAGE AND POSITION

(75) Inventors: Dale F. McIntyre, Honeoye Falls, NY (US); Jiebo Luo, Pittsford, NY (US); Wei Hao, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 884 days.

(21) Appl. No.: 12/022,361

(22) Filed: Jan. 30, 2008

(65) Prior Publication Data

US 2009/0190797 A1 Jul. 30, 2009

(51) Int. Cl.
G06K 9/60 (2006.01)
G06K 9/00 (2006.01)
G01C 21/30 (2006.01)
G01C 21/00 (2006.01)

(52) U.S. Cl. ........ 382/305; 382/103; 382/113; 701/208; 701/213

(58) Field of Classification Search .................... 382/305
See application file for complete search history.

(56) References Cited

U.S. PATENT DOCUMENTS

| | | | | |
|---|---|---|---|---|
| 7,271,725 B2* | 9/2007 | Sugiyama | .................. | 340/572.1 |
| 2006/0190812 A1* | 8/2006 | Ellenby et al. | ................ | 715/512 |
| 2006/0277188 A1* | 12/2006 | Irish et al. | ........................ | 707/10 |
| 2007/0032945 A1* | 2/2007 | Kaufman | ....................... | 701/208 |
| 2007/0055441 A1* | 3/2007 | Retterath et al. | .............. | 701/200 |
| 2007/0110338 A1* | 5/2007 | Snavely et al. | ............... | 382/305 |
| 2007/0136259 A1* | 6/2007 | Dorfman et al. | .................. | 707/3 |
| 2007/0156286 A1* | 7/2007 | Yamauchi | ..................... | 700/245 |
| 2007/0200713 A1* | 8/2007 | Weber et al. | ............... | 340/573.1 |
| 2007/0271297 A1* | 11/2007 | Jaffe et al. | ................... | 707/104.1 |
| 2007/0299604 A1* | 12/2007 | DiBernardo et al. | ......... | 701/207 |

FOREIGN PATENT DOCUMENTS

EP 1246080 10/2002

OTHER PUBLICATIONS

Li et al, What, where and who? Classifying event by scene and object recognition, Proceedings of ICCV 2007.
Li et al, A Bayesian hierarchical model for learning natural scene categories, Proc. of CVPR 2005.
Lazebnik et al, Beyond bags of features: spatial pyramid matching for recognizing natural scene categories, Proc. of CVPR 2006.
Zhu et al, Multi-class Adaboost, Technique Report 2005.
Hollerer et al, Anywhere Augmentation Towards Mobile Augmented Realilty in Unprepared Environments, Lecture Notes in Geoinformation and Cartography, Spring DE, vol. Section IV Jan. 1, 2007, pp. 393-416.
Navarrete et al, A semantic approach for the indexing and retrieval of geo-referenced video, First International Workshop on Semantic-Enhanced Multimedia Presentation Systems, Dec. 2006; pp. 1-13.
Clementini et al, Browsing in geographic databases: an object-oriented approach, Proceedings IEEE Workshop on Visual Languages, Los Alamitos, CA, Oct. 4, 1990, pp. 125-131.

* cited by examiner

Primary Examiner — David Zarka
(74) Attorney, Agent, or Firm — Raymond L. Owens

(57) ABSTRACT

A method of recognizing the environment of an image from an image and position information associated with the image includes acquiring the image and its associated position information; using the position information to acquire an aerial image correlated to the position information; identifying the environment of the image from the acquired aerial image; and storing the environment of the image in association with the image for subsequent use.

7 Claims, 5 Drawing Sheets

RECOGNIZING IMAGE ENVIRONMENT FROM IMAGE AND POSITION

FIELD OF THE INVENTION

The present invention relates to the recognition of the environment of an image by using image content and the position information associated with the location where the image was taken.

BACKGROUND OF THE INVENTION

Using a computer to analyze and discern the meaning of the content of digital media assets, known as semantic understanding, is an important field for enabling the creation of an enriched user experience with these digital assets. One type of semantic understanding in the digital imaging realm is the analysis that leads to identifying the type of event that the user has captured such as a birthday party, a baseball game, a concert and many other types of events where images are captured. Typically, events such as these are recognized using a probabilistic graphic model that is learned using a set of training images to permit the computation of the probability that a newly analyzed image is of a certain event type. An example of this type of model is found in the published article of L-J. Li and L. Fei-Fei, *What, where and who? Classifying event by scene and object recognition*, Proceedings of ICCV, 2007.

There is a need to improve the recognition of event types beyond what is currently available via classical approaches such as Bayesian networks. Oftentimes, entries in a geo-referenced namespace database are specific enough to help classify an event. There is a need to gain additional semantic knowledge of a location to help classify an image captured at that location.

SUMMARY OF THE INVENTION

In accordance with the present invention, there is provided a method of recognizing the environment of an image from an image and position information associated with the image, comprising:

(a) acquiring the image and its associated position information;

(b) using the position information to acquire an aerial image correlated to the position information;

(c) identifying the environment of the image from the acquired aerial image; and (d) storing the environment of the image in association with the image for subsequent use.

Features and advantages of the present invention include using a reference image associated with the position information of an image to achieve a better understanding of the type of environment of an image, and thus facilitating understanding the potential nature of an event or activity.

DETAILED DESCRIPTION OF THE INVENTION

Figure 1:
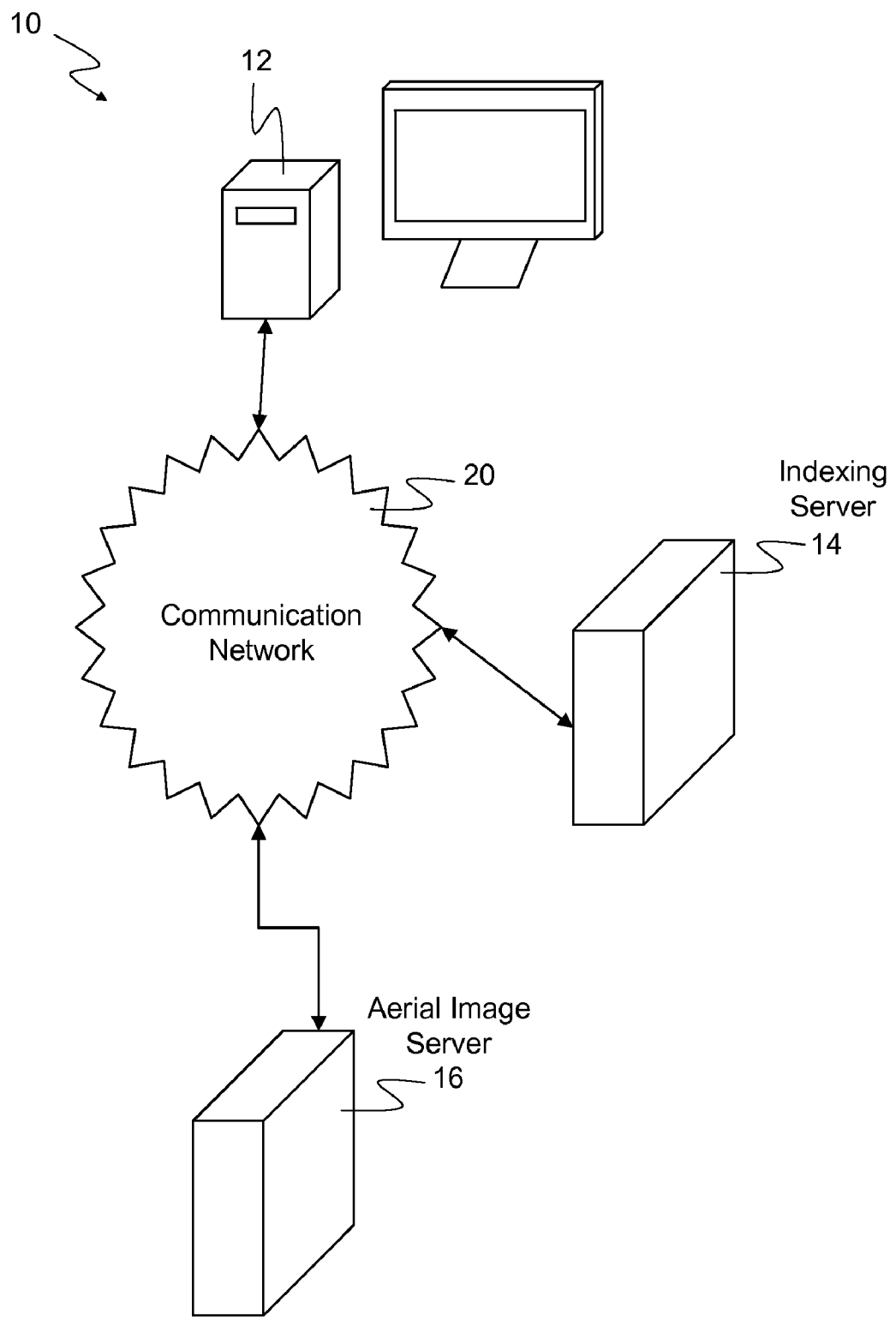
FIG. 1 is pictorial of a system that can make use of the present invention.

In FIG. 1, a system 10 is shown with the elements necessary to practice the current invention including a computing device 12, a indexing server 14, an aerial image server 16, and a communications network 20. Computing device 12 can be a personal computer for storing images where images will be understood to include both still and moving or video images. Computing device 12 communicates with a variety of devices such as digital cameras or cell phone cameras (not shown) for the purpose of storing images captured by these devices. These captured images can further include position information such as global positioning system (GPS) data provided by the capturing device. Computing device 12 can also communicate through communications network 20 to an internet service that uses images captured without position information and permits the user to add position information to the images. In either case, images with position information are well known in the art.

Indexing server 14 is another computer processing device available on communications network 20 for the purposes of executing the algorithms in the form of computer instructions that analyze the content of images for semantic information such as event type. It will be understood that providing this functionality in system 10 as a web service via indexing server 14 is not a limitation of the invention. Computing device 12 can also be configured to execute the algorithms responsible for the analysis of images provided for indexing.

Aerial image server 16 communicates with other computing devices via communications network 20 and upon request, aerial image server 16 provides an aerial image correlated to the provided position information. Aerial images stored on aerial image server 16 are captured by a variety of manned aircraft including airplanes or unmanned aircraft including satellites. Aerial images can be captured from cameras that look directly down or orthogonally to a specific altitude or they can be captured obliquely to preserve third dimensional information of the captured image. Pictometry International Corp. is one company that provides obliquely captured aerial images correlated to position information. Well known internet services provide satellite aerial images correlated to provided position information such as physical address, GPS data, or other forms of position information such as the name of a business that has a known position. Aerial images can have metadata associated with them, which can be stored in association with the aerial images on aerial image server. Metadata associated with the aerial images can include information such as names of businesses located within the physical area represented by the image, historical landmarks, parks and much more. These metadata can be provided with an aerial image upon request. Aerial images are also provided in a variety of resolutions representing capture or simulated capture from a specific altitude. High resolution aerial images show more detail and are typically more expensive to acquire. High resolution aerial images are larger files requiring more bandwidth and hence time to transmit.

Figure 2:
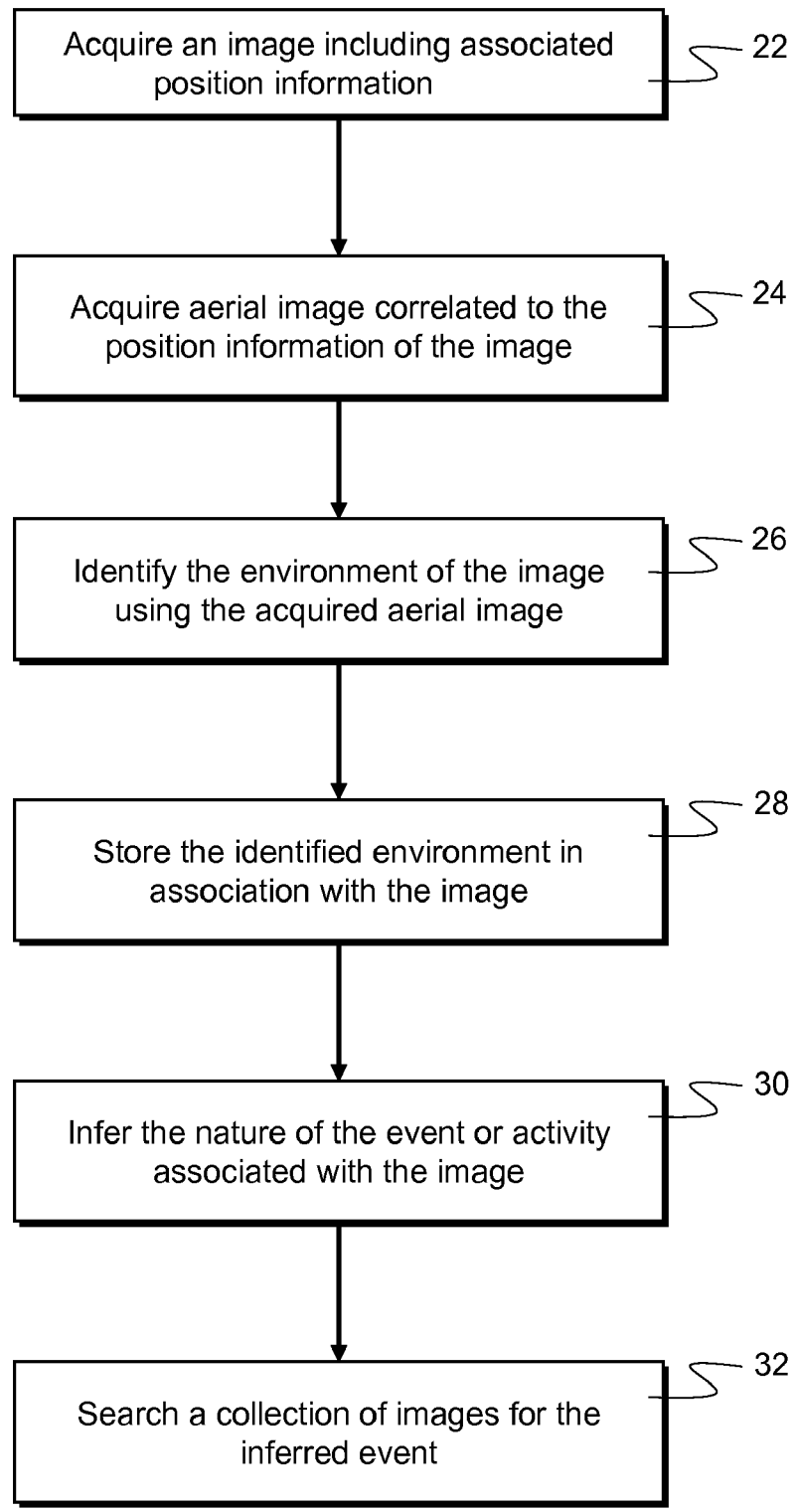
FIG. 2 is a flow chart for practicing an embodiment of the invention.

In FIG. 2, a process diagram is illustrated showing the sequence of steps necessary to practice the invention. In step 22, an image is acquired that includes associated position information such as GPS data. The position information is preferably associated with the image in the form of metadata, but can be merely supplied in association with the image without deviating from the scope of the invention. The image can be provided by computing device 12 from its internal storage or from any storage device or system accessible by computing device 12 such as a local network storage device or an online image storage site. Using the position information provided in step 22, computing device 12 provides the position information to aerial image server 14 in step 24 to acquire an aerial image correlated to the position information associated with the image.

Using the acquired aerial image of step 24, computing device 12 identifies the environment of the image in step 26 using classifiers in the following manner. Recently, many people have shown the efficacy of representing an image as an unordered set of image patches or "bag of visual words" (F.-F. Li and P. Perona, A Bayesian hierarchical model for learning natural scene categories, Proceedings of CVPR, 2005; S. Lazebnik, C. Schmid, and J. Ponce, Beyond bags of features: spatial pyramid matching for recognizing natural scene categories, Proceedings of CVPR, 2006). Suitable descriptions (e.g., so called SIFT descriptors) are computed for each of training images, which are further clustered into bins to construct a "visual vocabulary" composed of "visual words". The intention is to cluster the SIFT descriptors into "visual words" and then represent an image in terms of their occurrence frequencies in it. The well-known k-means algorithm is used with cosine distance measure for clustering these descriptors.

While this representation throws away the information about the spatial arrangement of these patches, the performances of systems using this type of representation on classification or recognition tasks are impressive. In particular, an image is partitioned by a fixed grid and represented as an unordered set of image patches. Suitable descriptions are computed for such image patches and clustered into bins to form a "visual vocabulary". In the present invention, the same methodology is adopted and extended it to consider both color and texture features for characterizing each image grid.

To extract color features, an image grid is further partitioned into 2×2 equal size sub-grids. Then for each subgrid, one can extract the mean R, G and B values to form a 4×3=12 feature vector which characterizes the color information of 4 sub-grids. To extract texture features, one can apply a 2×2 array of histograms with 8 orientation bins in each sub-grid. Thus a 4×8=32-dimensional SIFT descriptor is applied to characterize the structure within each image grid, similar in spirit to Lazebnik et al. In a preferred embodiment of the present invention, if an image is larger than 200,000 pixels, it is first resized to 200,000 pixels. The image grid size is then set to 16×16 with overlapping sampling interval 8×8. Typically, one image generates 117 such grids.

After extracting all the raw image features from image grids, the present invention builds separate color and texture vocabularies by clustering all the image grids in the training dataset through k-means clustering. In the present invention, both vocabularies are set to size 500. By accumulating all the grids in the training set of images, one obtains two normalized histograms for an event, hc and ht, corresponding to the word distribution of color and texture vocabularies, respectively. Concatenating hc and ht, the result is a normalized word histogram of size 1000. Each bin in the histogram indicates the occurrence frequency of the corresponding word.

For each input aerial image that was obtained based on the position coordinates, both color and texture bags of words are computed as described above. The images corresponding to a particular type (or class) of environment form the training set for that class. The training sets of all the classes form the total training set. A classifier is trained using this training set.

In a preferred embodiment of the present invention, a classifier known as SAMME (by J. Zhu, S. Rosset, H. Zou, and T. Hastie. Multi-class Adaboost. Technique Report, 2005) is selected as the classifier for solving the multi-class problem. Compared with another algorithm called AdaBoost.MH, which needs to perform K one-against-all classifications, SAMME performs K-class classification directly. It only requires weak classifiers better than random guess (e.g. correct probability larger than 1/K), rather than better than ½ as the standard two-class AdaBoost requires.

For each input aerial image that needs to be classified, both color and texture bags of words are computed as described above. The trained classifier is applied to the bags of words of the input image to produce a class of the environment for the input image.

Figure 3:
FIG. 3 is a table showing the ontological structure of example environment types.

It will be understood that some locations can have multiple environments. For example, Rotary Park on North Main Street in Honeoye Falls, N.Y. includes parking environments, picnic environments, fishing environments, and soccer environments. Broadly by way of example, but not limitation, identified environments can include baseball fields, football fields, tennis courts, golf courses, residential areas, commercial properties, schools, shopping malls, playgrounds, parks, beaches, forests, or theme parks. As shown in table 35 of FIG. 3, environments can have pre-established simplified environment ontologies associated with them. In both computer science and information science, an ontology is a data model that represents a set of concepts within a domain and the relationships between those concepts. It is used to reason about the objects within that domain. In the example of FIG. 3, a very simplified ontology is shown for two example environments. Relationships are not shown between the concepts listed in FIG. 3, but if established can assist in the use of the ontology of the environment for inferring the nature of an activity or event.

Figure 4A:
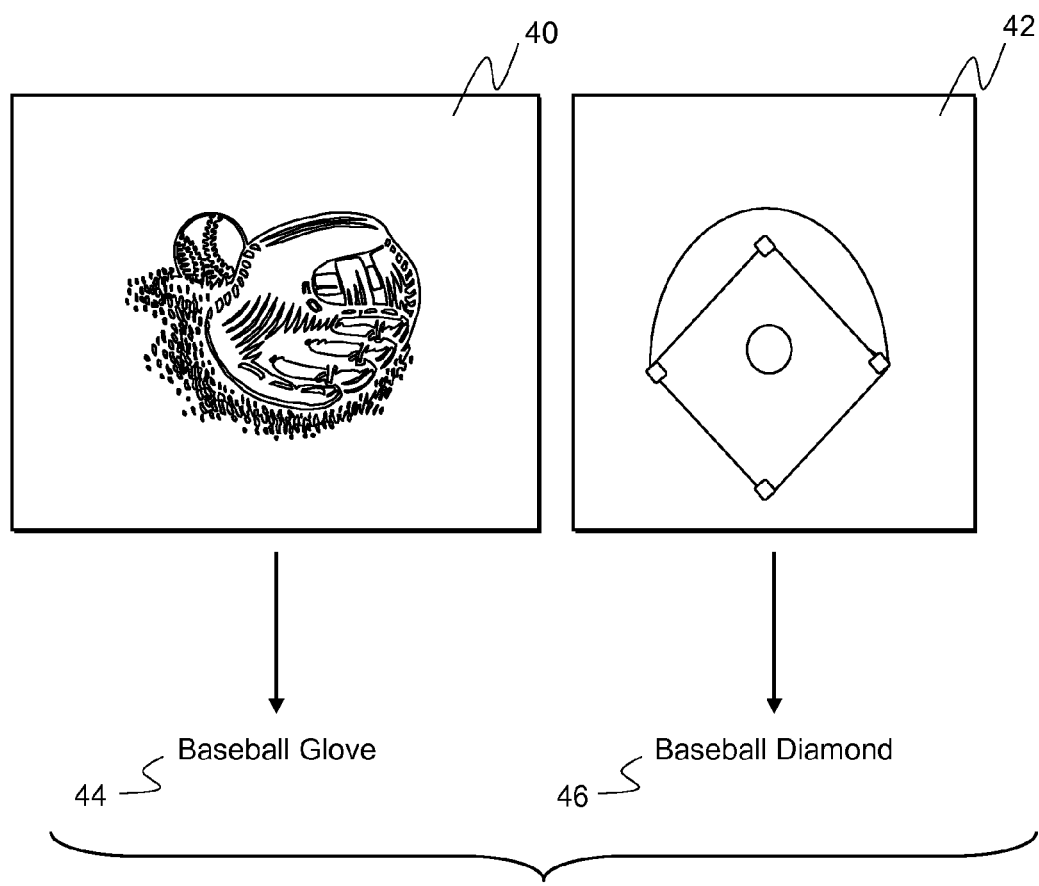
FIGS. 4a and 4b depict examples of images and their corresponding aerial images of the environment.
Figure 4B:
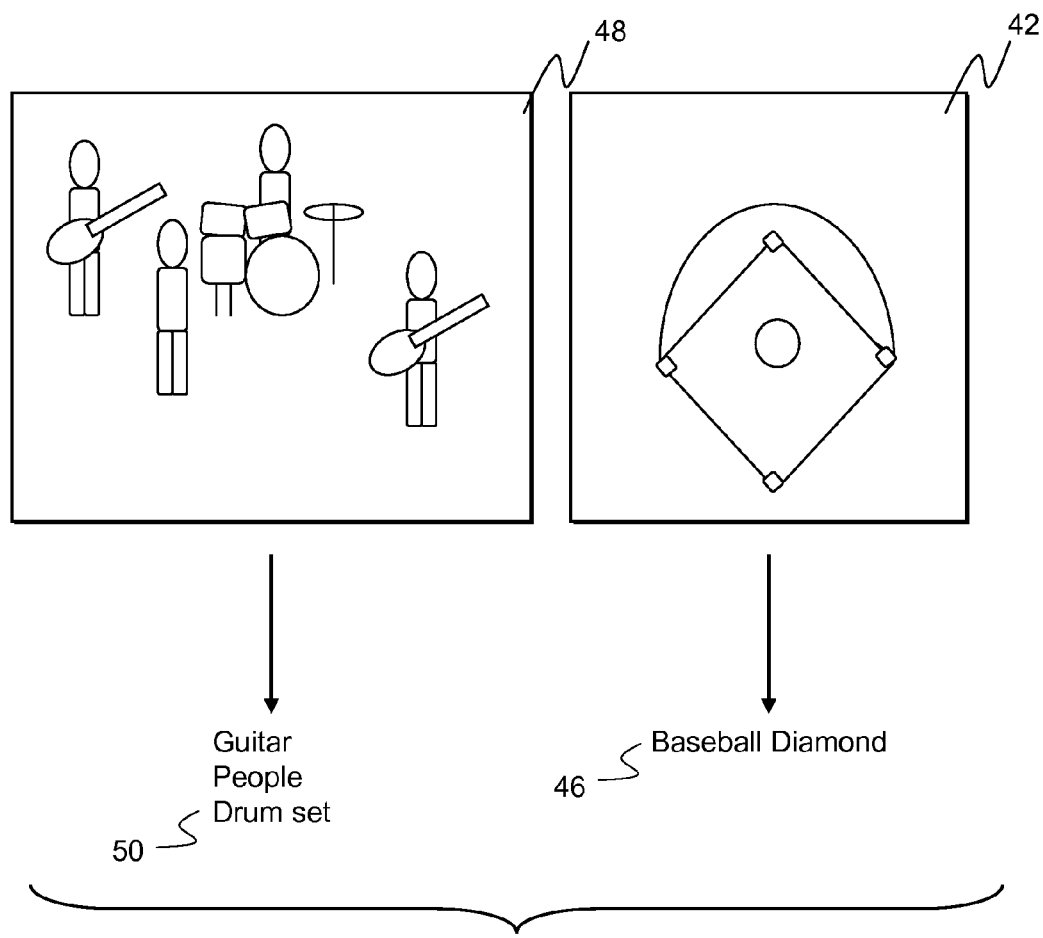

The identified environment of the image is then stored in association with the image in step 28. Preferably the identified environment is stored as metadata included with the image such as EXIF data, but the invention is not so limited. The identified environment can be stored as data in a database in association with the image. In step 30, inferences regarding the nature of the event or activity associated with the image are made from the stored environment of the image. Indexing server 14 or computing device 12 can infer from the stored environment of the image, for example a baseball field, that the nature of the event was a baseball game. This inference can lead to a valid classification of the event as a baseball game. If indexing server 14 can analyze the image as shown in FIG. 4*a* and detect the presence of a baseball glove and a baseball, then these objects also being found in the ontology of baseball field environment give more conclusive evidence that the event is properly classified as a baseball game. If however, as shown in FIG. 4*b*, objects such as guitar, people, and drum set are determined by analyzing the image and the environment is still a baseball field then the classification of the event as a baseball game is likely invalid. The proper inference, a concert, is made by looking at both the stored environment of the image and the image. If metadata have been provided with the aerial image, further information can be considered in combination with any of the other data when making the inference as to the nature of the event or activity associated with the image. Metadata provided with the acquired aerial image can be stored additively to the ontology of stored environment if desired for subsequent use.

Having inferred the nature of the activity or event allows computing device 12 to search a collection of images for the inferred event in step 32. The event type, the stored environment, the elements of the stored environment ontology or any metadata associated with the image or the aerial image may be used alone or in combination to frame the search of the collection of images. The collection of images to be searched may belong to the user of computing device 12 and resident thereon or it could be a public collection of images available for searching via communications network 20 with a tool such as Google Image search implemented by a web browser running on computing device 12. Another popular collection of images available for searching online with a web browser is maintained by FlickR™ where text tags are used to search for images.

In FIG. 4a, an image 40 is shown along with an acquired aerial image 42 provided by aerial image server 14 in response to the provision of position information associated with image 40. A list 44 shows the objects determined from the indexing analysis of image 40 while a list 46 shows the metadata associated with the acquired aerial image 42. The inference regarding the potential nature of the event being a baseball game is fairly conclusive and the terms in the list can be used to search for images in the collection that have similar content. Likewise in FIG. 4b, an image 48 captured with the same position information at a different time and date is shown along with acquired aerial image 42. A list 50 shows the objects determined from the indexing analysis of image 40. Comparing lists 50 and 46, the inference regarding the potential nature of the event as a baseball game is invalid. The conclusive inference of a concert is reached only upon consideration of both the stored environment of the image and the image.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

PARTS LIST 10 system
12 computing device
14 indexing server
16 aerial image server
20 communications network
22 step
24 step
26 step
28 step
30 step
32 step
35 table
40 image
42 acquired aerial image
44 list
46 list
48 image
50 list

The invention claimed is:

1. A method of recognizing an environment of an acquired digital image from the position information associated with the acquired digital image, comprising:
    (a) acquiring the digital image and its associated position information;
    (b) using the position information to select the appropriate resolution needed to identify the environment of the acquired digital image and acquire an outdoor digital aerial image correlated to the position information, wherein the acquired outdoor digital aerial image is a satellite image or an image acquired from aircraft;
    (c) using a computing device to identify the environment of the acquired digital image by analyzing the acquired outdoor digital aerial image;
    (d) storing the identified environment of the acquired digital image in association with the acquired digital image; and
    (e) making inferences from the stored identified environment of the acquired digital image as to the potential nature of an event or activity associated with the acquired digital image.

2. The method of claim 1 wherein the environment includes baseball fields, football fields, tennis courts, golf courses, residential areas, commercial properties, schools, shopping malls, playgrounds, parks, beaches, forests, or theme parks.

3. The method of claim 1 wherein the inferences are made from the stored environment of the acquired digital image and the acquired digital image.

4. The method of claim 1 wherein the stored environment is used to search a collection of digital images for the event.

5. The method of claim 1 further including acquiring metadata associated with the acquired outdoor digital aerial image and storing such metadata for subsequent use in association with the stored environment.

6. The method of claim 5 further including making inferences from the stored environment of the acquired digital image and the stored metadata as to the potential nature of the event or activity associated with the acquired digital image; and searching a collection of digital images for the event.

7. The method of claim 6 wherein the inferences are made from the stored environment of the acquired digital image, the acquired digital image and the metadata.

* * * * *